United States Patent
Bailey

[11] Patent Number: 5,904,857
[45] Date of Patent: May 18, 1999

[54] 4-ALKYL AND ARYL SEMICARBAZIDES AS OXYGEN SCAVENGERS

[75] Inventor: Bruce R. Bailey, Batavia, Ill.

[73] Assignee: Nalco Chemical Company, Naperville, Ill.

[21] Appl. No.: 08/839,854

[22] Filed: Apr. 17, 1997

[51] Int. Cl.⁶ .................................................... C02F 1/20
[52] U.S. Cl. .................. 210/750; 210/757; 252/188.28; 252/392; 422/16
[58] Field of Search .................................. 210/750, 757; 252/188.28, 392; 422/16

[56] References Cited

U.S. PATENT DOCUMENTS

| | | | |
|---|---|---|---|
| 2,322,184 | 6/1943 | White | 252/32 |
| 4,012,195 | 3/1977 | Noack | 252/400 R |
| 4,022,711 | 5/1977 | Noack | 252/188 |
| 4,026,664 | 5/1977 | Noack | 252/390 |
| 4,096,090 | 6/1978 | Noack | 252/390 |
| 4,269,717 | 5/1981 | Slovinsky | 210/750 |
| 4,363,734 | 12/1982 | Slovinsky | 210/750 |
| 4,399,098 | 8/1983 | Cuisia | 422/13 |
| 4,968,438 | 11/1990 | Soderquist et al. | 210/750 |
| 5,108,624 | 4/1992 | Bossler et al. | 210/750 |
| 5,169,598 | 12/1992 | Zetlmeisl et al. | 422/16 |
| 5,258,125 | 11/1993 | Kelley et al. | 210/750 |
| 5,384,050 | 1/1995 | Kelley et al. | 210/750 |
| 5,466,381 | 11/1995 | Goliaszewski et al. | 210/750 |

FOREIGN PATENT DOCUMENTS 2 279 347  4/1995  United Kingdom.

OTHER PUBLICATIONS

"Hydrazine and its Derivatives", Kirk–Othmer, *Encyclopedia of Chemical Technology,* Third Edition., vol. 12, John Wiley & Sons.

*Primary Examiner*—Peter A. Hruskoci
*Attorney, Agent, or Firm*—Thomas M. Breininger; Kelly L. Cummings

[57] ABSTRACT

A method for removing dissolved oxygen from alkaline water containing dissolved oxygen at a temperature greater than 250° F. which comprises the step of: adding to said alkaline water containing dissolved oxygen an effective oxygen-scavenging amount of a water-soluble semicarbazide of the formula

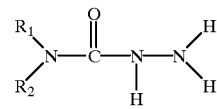

wherein $R_1$ and $R_2$ are selected from the group consisting of $C_1$–$C_{10}$ alkyl, cycloalkyl, aryl, cycloalkyloxy and alkyloxy groups.

Preferred materials are 4-phenyl semicarbazide, 4-isopropyl semicarbazide, 4-4-diethyl semicarbazide and carbazoyl morpholine. Below 400° F., a catalyst is also required.

44 Claims, 1 Drawing Sheet

4-ALKYL AND ARYL SEMICARBAZIDES AS OXYGEN SCAVENGERS

FIELD OF THE INVENTION

A method for removing dissolved oxygen from alkaline water containing dissolved oxygen at a temperature greater than 250° F. which comprises the step of: adding to said alkaline water containing dissolved oxygen an effective oxygen-scavenging amount of a water-soluble semicarbazide of the formula

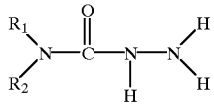

wherein $R_1$ and $R_2$ are selected from the group consisting of $C_1$–$C_{10}$ alkyl, cycloalkyl, aryl, cycloalkyloxy and alkyloxy groups.

Preferred materials are 4-phenyl semicarbazide, 4-isopropyl semicarbazide, 4-4-diethyl semicarbazide and carbazoyl morpholine. Below 400° F., a catalyst is also required.

BACKGROUND OF THE INVENTION

Efficient operation of boilers and other steam-run equipment requires chemical treatment of feedwater to control corrosion. Corrosion in such systems generally arises as a result of oxygen attack of steel in water supply equipment, pre-boiler systems, boilers, and condensate return lines. Oxygen attack of steel is exacerbated by the unavoidable high temperatures found in boiler equipment. Since acidic conditions also accelerate corrosion, most boiler systems are run in an alkaline environment.

The action of dissolved gases such as oxygen and carbon dioxide are two of the main factors that lead to feedwater system and boiler corrosion. In order to understand the role of dissolved gases in corrosion, one must understand the electrochemical nature of corrosion.

Corrosion processes involve reactions where one species is oxidized $$M \rightarrow M^{2+} + 2e^-$$

and another is reduced.

$$x + e^- \rightarrow x^-$$

In boiler systems the two species involved in the redox chemistry are typically two different metals, a metal and oxygen, or a metal and water. Under most conditions, oxidation of iron occurs.

$$Fe^0 \rightarrow Fe^{2+} + 2e^-$$

A current of electrons then flows from this anodic region to a point where reduction takes place. If oxygen is present, the cathodic reaction is $$O_2 + H_2O + 4e^- \rightarrow 4OH^-$$

In the absence of oxygen, water is reduced to hydrogen.

$$2H_2O + 2e^- \rightarrow H_2 + 2OH^-$$

Any agent that inhibits either the anodic or cathodic reaction will stop corrosion from occurring. Metal passivation, the formation of a protective oxide film, is one common example of a process that inhibits corrosion by blocking one of the electrochemical reaction pathways.

The severity of oxygen corrosion will depend on the concentration of dissolved oxygen in the water, water pH and temperature. As water temperature increases, corrosion in feed lines, heaters, boiler, steam and return lines made of iron and steel increases.

In most modern boiler systems, dissolved oxygen is handled by first mechanically removing most of the dissolved oxygen and then chemically scavenging the remainder. Mechanical degasification is typically carried out with deaerating heaters, which will reduce oxygen concentrations to the range of 0.005–0.050 mg/L.

Chemical scavenging of the remaining dissolved oxygen is widely accomplished by treating the water with an oxygen scavenger, such as hydrazine or sodium sulfite. See, for example, the Kirk-Othmer Encyclopedia of Chemical Technology, Third Edition, Interscience Publishers, Volume 12, pages 734–771 in reference to hydrazine. As explained in Kirk-Othmer, hydrazine efficiently eliminates the residual oxygen by reacting with the oxygen to give water and gaseous nitrogen. In addition, hydrazine is a good metal passivator since it forms and maintains an adherent protective layer of magnetite over iron surfaces.

It is, however, widely recognized that hydrazine is a toxic chemical. Kirk-Othmer reports that it is highly toxic and readily absorbed through the mouth, skin and respiratory system, and that permanent corneal damage may result from contact with the eye. Low doses may cause central nervous system depression and high doses may cause convulsions and other damaging side effects.

Among other approaches to the scavenging of oxygen in boiler systems include: carbohydrazones as disclosed in U.S. Pat. No. 5,258,125; gallic acid as disclosed in U.S. Pat. No. 4,968,438; hydrazones as disclosed in U.S. Pat. No. 5,384,050; carbohydrazide as disclosed in U.S. Pat. No. 4,269,717 and 1,3 dihydroxy acetone as disclosed in U.S. Pat. No. 4,363,734.

Semicarbazone derivatives have been disclosed as additives in lubricating oils in U.S. Pat. No. 2,322,184. However, there is no indication that they would be effective additives to water-based systems.

Semicarbazides have been disclosed for deoxygenating liquids in U.S. Pat. Nos. 4,399,098 and 5,108,624. A "hydrocarbazide" containing urea derivative is proposed as a boiler water treating agent in U.K. Patent Application No. 2,279,347. The functional group is described as $C(O)NH=NH_2$ in the specification and $C(O)N=NH_2$ in the claims. However, none of these references teach the substituted semicarbazides of the instant invention.

There is still a need for more efficient and less toxic treatment chemicals. Therefore, it is an object of this invention to provide oxygen scavenging treatments which scavenge oxygen and reduce corrosion rates of steel surfaces under typical boiler use conditions while reducing the potential of exposure to hydrazine.

SUMMARY OF THE INVENTION

A method for removing dissolved oxygen from alkaline water containing dissolved oxygen at a temperature greater than 250° F. which comprises the step of: adding to said alkaline water containing dissolved oxygen an effective oxygen-scavenging amount of a water-soluble semicarbazide of the formula

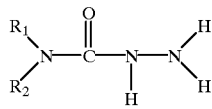

wherein $R_1$ and $R_2$ are selected from the group consisting of $C_1$–$C_{10}$ alky, cycloalkyl, aryl, cycloalkyloxy and alkyloxy groups.

Preferred materials are 4-phenyl semicarbazide, 4-isopropyl semicarbazide, 4-4-diethyl semicarbazide and carbazoyl morpholine. Below 400° F., a catalyst is also required.

DESCRIPTION OF THE INVENTION

Figure 1:
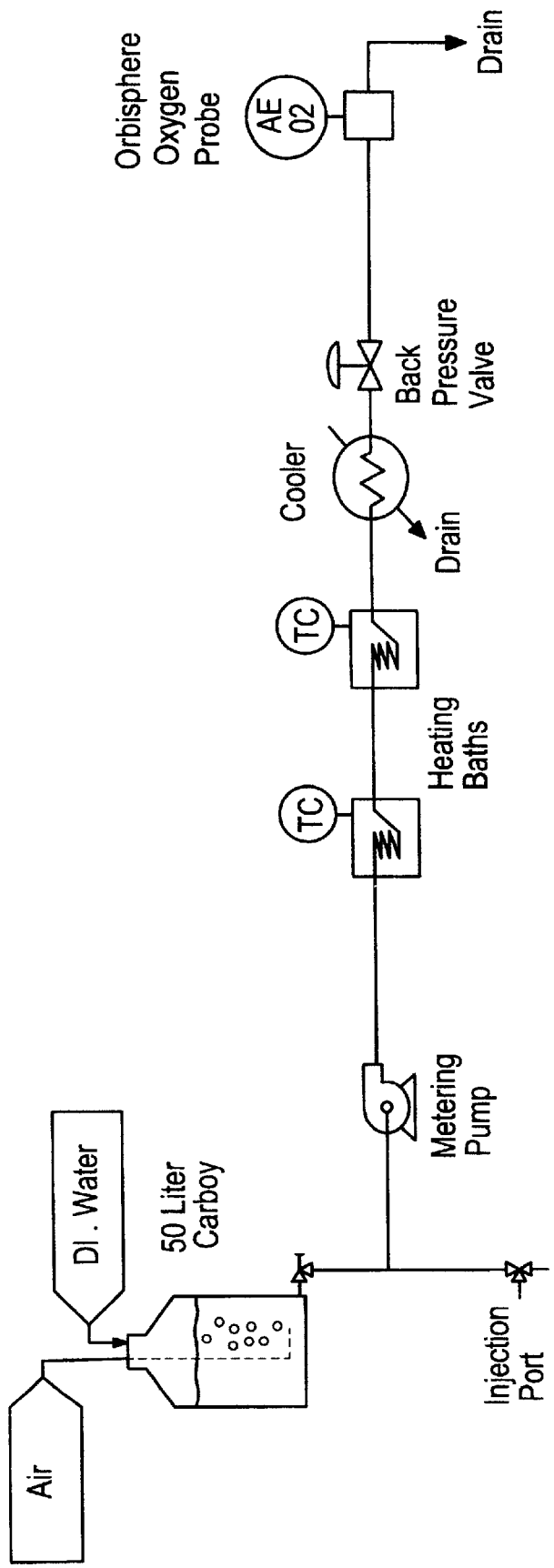
FIG. 1 is a schematic of a scavenger screening apparatus.

The invention is generally directed to reducing corrosion in boiler systems and more particularly to treating boiler water to remove dissolved oxygen.

The invention is a method for removing dissolved oxygen from alkaline water containing dissolved oxygen at a temperature greater than 400° F. which comprises the step of: adding to said alkaline water containing dissolved oxygen an effective oxygen-scavenging amount of a water-soluble semicarbazide of the formula

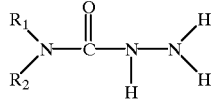

wherein $R_1$ and $R_2$ are selected from the group consisting of $C_1$–$C_{10}$ alkyl, cycloalkyl, aryl, cycloalkyloxy and alkyloxy groups.

For the practice of this method, $R_1$ may be selected from the group consisting of morpholino, cyclohexyl, ethyl, isopropyl, methyl, 3-methoxypropyl and phenyl groups and $R_2$ is selected from the group consisting of hydrogen, ethyl and morpholino groups. From 0.5 to 10 moles of semicarbazide per mole of dissolved oxygen may be added to said water. Furthermore, the alkaline water may be boiler water. That boiler water may be subjected to deaeration to reduce the level of dissolved oxygen and said semicarbazide is added to said boiler water after deaeration to remove remaining dissolved oxygen. $R_1$ and $R_2$ may be morpholino groups. Alternatively, $R_1$ may be a cyclohexyl group and $R_2$ may be hydrogen. Additionally, $R_1$ and $R_2$ may be ethyl groups. Moreover, $R_1$ may be an isopropyl group and $R_2$ may be hydrogen. Also, $R_1$ may be a phenyl group and $R_2$ may be hydrogen.

The invention is also a method for removing dissolved oxygen from alkaline water containing dissolved oxygen at a temperature from about 250 to about 400° F. which comprises the step of adding to said alkaline water containing dissolved oxygen a) an effective oxygen-scavenging amount of a water soluble semicarbazide of the formula

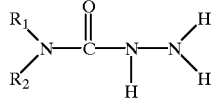

wherein $R_1$ and $R_2$ are selected from the group consisting of $C_1$–$C_{10}$ alkyl, cycloalkyl, aryl, cycloalkyloxy and alkyloxy groups; and b) an effective catalyzing amount of a catalyst capable of undergoing oxidation-reduction reactions selected from the group consisting of copper, cobalt, manganese, nickel, hydroquinone and combinations thereof. Herein $R_1$ may be selected from the group consisting of morpholino, cyclohexyl, ethyl, isopropyl, methyl, 3-methoxypropyl and phenyl groups and $R_2$ may be selected from the group consisting of hydrogen, ethyl and morpholino groups. From 2 to 10 moles of semicarbazide per mole of dissolved oxygen may be added to said water. Furthermore, the alkaline water may be boiler water. That boiler water may be subjected to deaeration to reduce the level of dissolved oxygen and said semicarbazide is added to said boiler water after deaeration to remove remaining dissolved oxygen. Alternatively, $R_1$ and $R_2$ may be morpholino groups. Additionally, $R_1$ may be a cyclohexyl group and $R_2$ may be hydrogen. Moreover, $R_1$ and $R_2$ may be ethyl groups. In addition, $R_1$ may be an isopropyl group and $R_2$ may be hydrogen. Also, $R_1$ may be a phenyl group and $R_2$ may be hydrogen.

Another aspect of the invention is a method for removing dissolved oxygen from alkaline water containing dissolved oxygen at a temperature greater than 400° F. which comprises the step of: adding to said alkaline water containing dissolved oxygen an effective oxygen-scavenging amount of a water-soluble semicarbazide of the formula

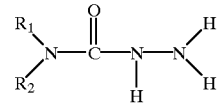

wherein $R_1$ and $R_2$ are selected from the group consisting of $C_1$–$C_{10}$ alkyl, cycloalkyl, aryl, cycloalkyloxy and alkyloxy groups; and an effective neutralizing amount of a neutralizing amine. The neutralizing amine may be selected from the group consisting of cyclohexylamine, morpholine, diethylethanolamine and methoxypropylamine. Moreover, 0.1–6 weight percent of said semicarbazide and 0.1–40 weight percent of said neutralizing amine may be added to said alkaline water. $R_1$ may be selected from the group consisting of morpholino, cyclohexyl, ethyl, isopropyl, methyl, 3-methoxypropyl and phenyl groups and $R_2$ is selected from the group consisting of hydrogen, ethyl and morpholino groups. From 0.5 to 10 moles of semicarbazide per mole of dissolved oxygen may be added to said water. The alkaline water may be boiler water. The boiler water may be subjected to deaeration to reduce the level of dissolved oxygen and said semicarbazide may be added to said boiler water after deaeration to remove remaining dissolved oxygen. Furthermore, for the practice of this invention, $R_1$ and $R_2$ may be morpholino groups. Alternatively, $R_1$ may be a cyclohexyl group and $R_2$ may be hydrogen. $R_1$ and $R_2$ may be ethyl groups. Additionally, $R_1$ may be an isopropyl group and $R_2$ may be hydrogen. Moreover, $R_1$ may be a phenyl group and $R_2$ may be hydrogen.

It is a common practice to feed volatile neutralizing amines to a boiler system. The primary purpose of feeding neutralizing amines to a boiler is to minimize corrosion in the boiler condensate system. Neutralizing amines can be injected directly to the steam header or more commonly to the boiler feedwater downstream of the deaerator. Often it is desirable to feed a blended product to the boiler to minimize chemical feed points. Unfortunately, many common oxygen scavengers are not stable in product formulations containing high concentrations of neutralizing amines. However, the semicarbazides of the instant invention are stable in formulations containing high concentrations of commonly used neutralizing amines.

Yet another aspect of this invention is a method for removing dissolved oxygen from alkaline water containing dissolved oxygen at a temperature from about 250 to about 400° F. which comprises the step of adding to said alkaline water containing dissolved oxygen a) an effective oxygen-scavenging amount of a water soluble semicarbazide of the formula

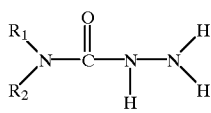

wherein $R_1$ and $R_2$ are selected from the group consisting of $C_1$–$C_{10}$ alkyl, cycloalkyl, aryl, cycloalkyloxy and alkyloxy groups;

b) an effective catalyzing amount of a catalyst capable of undergoing oxidation-reduction reactions selected from the group consisting of copper, cobalt, manganese, nickel, hydroquinone and combinations thereof; and c) an effective neutralizing amount of a neutralizing amine.

For the practice of this method, the neutralizing amine may be selected from the group consisting of cyclohexylamine, morpholine, diethylethanolamine and methoxypropylamine. 0.1–6 weight percent of said semicarbazide and 0.1–40 weight percent of said neutralizing amine may be added to said alkaline water. $R_1$ may be selected from the group consisting of morpholino, cyclohexyl, ethyl, isopropyl, methyl, 3-methoxypropyl and phenyl groups and $R_2$ may be selected from the group consisting of hydrogen ethyl and morpholino groups. From 2 to 10 moles of semicarbazide per mole of dissolved oxygen may be added to said water. The alkaline water may be boiler water. The boiler water may be subjected to deaeration to reduce the level of dissolved oxygen and said semicarbazide may be added to said boiler water after deaeration to remove remaining dissolved oxygen. Furthermore, $R_1$ and $R_2$ may be morpholino groups. Also, $R_1$ may be a cyclohexyl group and $R_2$ may be hydrogen. Alternatively, $R_1$ and $R_2$ may be ethyl groups. $R_1$ may be an isopropyl group and $R_2$ may be hydrogen. Moreover, $R_1$ may be a phenyl group and $R_2$ may be hydrogen.

Although the semicarbazide compounds may be added to the boiler system at any point, it is most efficient to treat the boiler feedwater, preferably as it comes from the dearator. Residence times prior to steam formation should be maximized to obtain maximum corrosion protection. Semicarbazide compounds will reduce oxygen and corrosion rates even at residence times of less than 3 minutes.

The amount of semicarbazide compound required to effectively scavenge oxygen from the boiler water is dependent upon the amount of oxygen actually present therein. It is generally desirable that at least 2 moles of semicarbazide be used per mole of oxygen. These minimum levels of semicarbazide compounds will have the added benefit of reducing general corrosion.

Semicarbazide compounds are effective oxygen scavengers and also reduce general corrosion rates over the entire range of temperatures to which boiler water is generally subjected. Typically, these temperatures will lie in the range of 190–550° F.

While semicarbazide compounds may be used alone effectively in the present application, they may also have enhanced activity when catalyzed. For this purpose, it is desirable to employ catalysts which undergo redox reactions. Useful catalysts in the present application include cobalt, preferably in a stabilized form. The amount of cobalt used should be in the range of 0.2 to about 20% by weight of the semicarbazide compound. Typical useful stabilized cobalt complexes are described in the following U.S. Pat. No. which are incorporated by reference: 4,012,195; 4,022,711; 4,026,664 and 4,096,090.

Copper (II) salts are also useful catalysts. As used herein, the term alkaline water refers to water with a pH of at least 8.

Other complexing agents may be admixed either to provide stability in a boiler or to provide protection of these formulations against contact with hardness ions and the like. The complexing agents can include, but are not necessarily limited to, ethylenediaminetetraacetic acid, nitrilotriacetic acid, and such other low molecular weight carboxylate acids, such as citric acid, acetic acid, propionic acid, maleic acid, malic acid, among others, or their salts.

In addition, these materials may be formed and formulated in the presence of polymers that are water soluble, which polymers would normally be used to treat boiler waters. These polymers normally contain carboxylate containing monomers, and the polymers are water soluble. The polymers include homopolymers and copolymers of acrylic acid, methacrylic acid, maleic acid, maleic anhydride, itaconic acid, and the like. When these polymers are copolymeric in nature, the other monomer units may be chosen from at least one of the group consisting of acrylamide, methylacrylamide, acrylic acid, methacrylic acid, maleic acid, or anhydride, and the like. Polymers and copolymers of acrylic acid and methylacrylic acid and other carboxylated polymers may also contain at least one of the sulfonated monomer species such as, but not limited to, vinyl sulfonate and N-substituted sulfonic acid acrylamides, sulfonated styrenes, among others.

Finally, these oxygen scavenging formulations may contain inorganic acids, other organic acids and buffering agents, amino acids, orthophosphate ion sources or other precipitating anion sources, organic phosphonate compounds, among others.

Even though the oxygen scavenging formulation itself may not contain these materials, the boiler waters being treated may still be additionally treated with at least one or combinations of these other ingredients such that the boiler water itself may contain any one or any combination of any of these materials as outlined above.

When we use the term boiler waters, we are primarily describing any water source that is external or internal to an operating industrial steam generating system, particularly boiler systems that are operating at pressures ranging from 50 PSIG up to and including 2,000 PSIG, and above. These boiler waters can include, but again are not necessarily limited to, deaerator drop-leg waters, boiler feed waters, internal boiler waters, boiler condensate waters, any combination thereof and the like. The boiler waters are normally treated by simply adding to the water to be treated a formulation, which formulation contains an effective oxygen scavenging amount of at least one of our compounds, as described above, and which may also contain other antioxidants, polymers, acid and/or base neutralizing agents, sequestering and/or chelating agents, also as described above.

The following examples are presented to describe preferred embodiments and utilities of the invention and are not meant to limit the invention unless otherwise stated in the claims appended hereto.

EXAMPLE 1

To synthesize carbazoyl morpholine, 24 g (0.75 moles) of anhydrous hydrazine and 100 ml of THF were charged to a nitrogen purged 1 L round bottom flask equipped with a condenser, addition funnel, thermometer and stirrer. 50 g (0.33 moles) of 4-morpholinecarbonyl chloride was dissolved in 100 ml of THF, then added to the addition funnel. The reaction was cooled in an ice bath to <10° C. The 4-morpholinecarbonyl chloride was next added drop wise over a two hour period. The rate of addition was adjusted as needed to keep the temperature below 10° C. The maximum temperature obtained was 17° C. The reaction mixture was a slurry of white solid, which was allowed to stir for 1 hour after the addition of the acid chloride was completed. The white solid was filtered and washed with 50 ml of THF. The solid was then dissolved in 300 ml of hot absolute ethanol and hot filtered to remove any insoluble material. The product was recrystallized a second time from ethanol to give 44.2 g of product with a mp of 88–110°C. A third crystallization from ethylacetate produced a product that melted at 118–121° C. Elemental analysis found: C 41.28%, H 7.68% and N 29.49%, expected C 41.37%, H 7.64% and N 28.95%.

EXAMPLE 2

To synthesize N-isopropyl semicarbazide, 200 ml of THF was added to a nitrogen purged 1 L round bottom flask, equipped with a stirrer, thermometer, condenser and 250 ml addition funnel. 20 g (0.625 moles) of anhydrous hydrazine was added to the pot and cooled in an ice bath. 25 g (0.294 moles) of isopropyl isocyanate and 200 ml of THF were charged to the addition funnel. The isocyanate solution was added drop wise over a 45 minute period. The reaction was exothermic and the rate of addition was regulated as needed to keep the temperature below 20° C. After stirring at room temperature for 30 minutes, there was no detectable level of isocyanate (IR analysis). A small amount (0.2 g) of insoluble material was filtered, and the THF and excess hydrazine were removed under reduced pressure to give a tan crystalline solid. The product was recrystallized from 50 ml of THF and washed with 150 ml of cold THF (−40° C.). Yield 24 g (70%), mp 73–5° C. Elemental analysis found, C 41.66%, H 9.58% and N 35.66%, expected C 41.03%, H 9.40 and N 35.90%.

EXAMPLE 3

To synthesize N,N-diethylsemicarbazide, 35.4 g (0.1.1 moles) of diethylcarbamyl chloride and 100 ml were charged to a nitrogen purged 1 L round bottom flask equipped with a thermometer, condenser and addition funnel. 50 g (0.37 moles) of diethyl carbamyl chloride was dissolved in 100 ml of THF and added to the addition funnel. The acid chloride was charged drop wise over 40 minutes. The exothermic reaction heated the reaction solution to about 60° C. The reaction was then refluxed for 4 hours. After cooling to room temperature, the THF solution was decanted from a white precipitate that had formed. The solution was then cooled in an ice bath, which caused additional material to precipitate. The solid (29 g wet weight, hydrazine hydrochloride) was filtered and the THF solution concentrated on a rotary evaporator to give 44 g (90.7%) of light yellow oil. Crystallization could not be induced with either ethanol or ether. Analysis found 0.32 ppm residual hydrazine. $^{13}C$ NMR spectra was consistent with the desired product. Elemental analysis found: C 30.0%, H 6.5% and N 19.2%, expected C 45.78%, H 9.99% and N 32.03%. Elemental analysis results are consistently low by about 35%, indicating contamination with a material not containing C, H or N.

EXAMPLE 4

The apparatus of FIG. 1 was utilized to evaluate the efficiency of various oxygen scavengers. Reference is made to FIG. 1. The feedstream was ambient temperature (22° C.) air-saturated deionized water. Air-saturation of the feedwater was maintained with a continuous purge with $CO_2$-free air. The pH of the feedwater was adjusted to within the range of 9.0–9.5 with reagent grade sodium hydroxide. All wetted parts were constructed from 316 stainless steel. Syringe infusion pumps were used for injection of scavenger and catalyst. A metering pump pressurized the flow to 85 psig. The first heating bath heated the water stream to about 214° F. in about 30 seconds. The water residence time in the second bath was 4.5 minutes, and the effluent temperature was 251° F. The water stream was cooled slightly below ambient temperature within a few seconds, the pressure was released, and the oxygen concentration of the effluent water was continuously monitored utilizing an Orbisphere oxygen probe at the exit sample point.

The data of Table 1 illustrate a remarkable reduction in dissolved $O_2$ for the scavengers of this invention when utilized in conjunction with a catalyst in this temperature range.

A further advantage is that if the semicarbazide oxygen scavenger contains a chromophone, such as the 4-phenylsemicarbazide, the scavenger can also be utilized to monitor the feed of the material to a process stream by utilizing a spectrophotometric method such as fluorescence.

TABLE I

| Oxygen Scavenger Treatment | Equivalence Scavenger:$O_2$ | Temp. (° F.) | Dissolved $O_2$ (ppb) | Catalyst |
|---|---|---|---|---|
| None | — | 250 | 7800–8300 | none |
| 4-phenyl semi-carbazide[1] | 2:1 | 250 | 7480 | none |
| 4-phenyl semi-carbazide[1] | 2:1 | 250 | 4180 | Co |
| 4-phenyl semi-carbazide[1] | 2:1 | 250 | 164 | Cu |
| 4-isopropyl-semicarbazide[2] | 2:1 | 250 | 7500 | none |
| 4-isopropyl-semicarbazide[2] | 2:1 | 250 | 6500 | Co |
| 4-isopropyl-semicarbazide[2] | 2:1 | 250 | 98 | Cu |
| 4,4-diethyl-semicarbazide[3] | 2:1 | 250 | 7300 | none |
| 4,4-diethyl-semicarbazide[3] | 2:1 | 250 | 6500 | Co |
| 4,4-diethyl-semicarbazide[3] | 2:1 | 250 | 189 | Cu |
| Carbazoyl morpholine[4] | 1:1 | 250 | 8000 | none |
| Carbazoyl morpholine[4] | 2:1 | 250 | <100 | Co/Cu |
| Hydrazine | 2:1 | 250 | 7500 | none |
| Hydrazine | 2:1 | 250 | 241 | Cu |

1 = available from Aldrich Chemical Co.
2 = synthesized according to the procedure of Example 2
3 = synthesized according to the procedure of Example 3
4 = synthesized according to the procedure of Example 1

EXAMPLE 5

One problem associated with certain conventional oxygen scavenger treatments, notably carbohydrazide, is that an undesirable concentration of hydrazine tends to build up over time in formulations containing neutralizing amines. A comparative stability study was conducted wherein hydrazine buildup in the treatment was monitored over a period of days by the p-dimethylaminobenzaldehyde method (ASTM Manual of Industrial Water, D1385-78, 376 (1979). The results of Table II demonstrate that the carbazoyl morpholine produces a much lower amount of undesirable hydrazine than the conventional treatment.

TABLE II

Hydrazine (ppm) Concentrations in High Amine Formulations

| Treatment | Hydrazine (ppm) | | |
|---|---|---|---|
| | at 0 days | at 3 days | at 6 days |
| 6% CHz[1] | 54 | 56 | 59 |
| 6% CHz[1] in 40% morpholine | 94 | 280 | 465 |
| 6% CHz[1] in 40% cyclohexylamine | 433 | 1420 | 2100 |
| 6% CM[2] | 60 | 48 | 53 |
| 6% CM[2] in 40% morpholine | 63 | 52 | 57 |
| 6% CM[2] in 40% cyclohexylamine | 63 | 89 | 121 |

1 = carbohydrazide, available from Aldrich Chemical Co.
2 = carbazoyl morpholine synthesized according to the procedure in Example 1

EXAMPLE 6

The procedure described in Example 5 was utilized to study long term stability. The scavengers of this invention do not lead to unacceptably high amounts of hydrazine, even when stored over a period of several weeks. Thus, they are more advantageous than the conventional carbohydrazide treatment.

TABLE III

Hydrazine (ppm) Concentrations in High Amine Formulations

| Treatment | Hydrazine (ppm) | | | |
|---|---|---|---|---|
| | at 0 weeks | at 5 weeks | at 8 weeks | at 13 weeks |
| 6% CM[2]/40% morpholine | 63 | 50 | — | 54 |
| 6% CM[2]/40% CHA[4] | 63 | 248 | — | 365 |
| 6% CHz[1]/40% morpholine | 94 | 2016 | — | — |
| 6% CHz[1]/40% CHA[4] | 433 | 6300 | — | — |
| 6% DESC[3]/40% CHA[4] | 114 | 149 | 178 | — |

1 = Carbohydrazide, available from Aldrich Chemical Co.
2 = Carbazoylmorpholine synthesized according to the procedure in Example 1
3 = 4,4-diethylsemicarbazide synthesized according to the procedure in Example 3
4 = cyclohexylamine Changes can be made in the composition, operation and arrangement of the method of the present invention described herein without departing from the concept and scope of the invention as defined in the following claims:

I claim:

1. A method for removing dissolved oxygen from alkaline water containing dissolved oxygen at a temperature greater than 400° F. which comprises the step of: adding to said alkaline water containing dissolved oxygen an effective oxygen-scavenging amount of a water-soluble semicarbazide of the formula

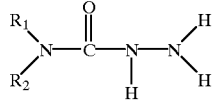

wherein $R_1$ is selected from the group consisting of $C_1$–$C_{10}$ alkyl, cycloalkyl, aryl, cycloalkyloxy and alkyloxy groups, and $R_2$ is selected from the group consisting of hydrogen, and $C_1$–$C_{10}$ alkyl, cycloalkyl, aryl, cycloalkyloxy, and alkyloxy groups.

2. The method of claim 1 wherein $R_1$ is selected from the group consisting of morpholino, cyclohexylamino, ethyl, isopropyl, methyl, 3-methoxypropyl and phenyl groups and $R_2$ is selected from the group consisting of hydrogen, ethyl and morpholino groups.

3. The method of claim 1 wherein from 0.5 to 10 moles of semicarbazide per mole of dissolved oxygen are added to said water.

4. The method of claim 1 wherein said alkaline water is boiler water.

5. The method of claim 4 wherein said boiler water is subjected to deaeration to reduce the level of dissolved oxygen and said semicarbazide is added to said boiler water after deaeration to remove remaining dissolved oxygen.

6. The method of claim 1 wherein $R_1$ and $R_2$ are morpholino groups.

7. The method of claim 1 wherein $R_1$ is a cyclohexyl group and $R_2$ is hydrogen.

8. The method of claim 1 wherein $R_1$ and $R_2$ are ethyl groups.

9. The method of claim 1 wherein $R_1$ is an isopropyl group and $R_2$ is hydrogen.

10. The method of claim 1 wherein $R_1$ is a phenyl group and $R_2$ is hydrogen.

11. A method for removing dissolved oxygen from alkaline water containing dissolved oxygen at a temperature from about 250 to about 400° F. which comprises the step of adding to said alkaline water containing dissolved oxygen
 a) an effective oxygen-scavenging amount of a water soluble semicarbazide of the formula

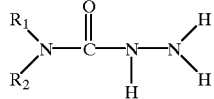

wherein $R_1$ is selected from the group consisting of $C_1$–$C_{10}$ alkyl, cycloalkyl, aryl, cycloalkyloxy and alkyloxy groups, and $R_2$ is selected from the group consisting of hydrogen, and $C_1$–$C_{10}$ alkyl, cycloalkyl, aryl, cycloalkyloxy, and alkyloxy groups; and
 b) an effective catalyzing amount of a catalyst capable of undergoing oxidation-reduction reactions selected from the group consisting of copper, cobalt, manganese, nickel, hydroquinone and combinations thereof.

12. The method of claim 11 wherein $R_1$ is selected from the group consisting of morpholino, cyclohexylamino, ethyl, isopropyl, methyl, 3-methoxypropyl and phenyl groups and $R_2$ is selected from the group consisting of hydrogen, ethyl and morpholino groups.

13. The method of claim 11 wherein from 2 to 10 moles of semicarbazide per mole of dissolved oxygen are added to said water.

14. The method of claim 11 wherein said alkaline water is boiler water.

15. The method of claim 14 wherein said boiler water is subjected to deaeration to reduce the level of dissolved oxygen and said semicarbazide is added to said boiler water after deaeration to remove remaining dissolved oxygen.

16. The method of claim 11 wherein $R_1$ and $R_2$ are morpholino groups.

17. The method of claim 11 wherein $R_1$ is a cyclohexyl group and $R_2$ is hydrogen.

18. The method of claim 11 wherein $R_1$ and $R_2$ are ethyl groups.

19. The method of claim 11 wherein $R_1$ is an isopropyl group and $R_2$ is hydrogen.

20. The method of claim 11 wherein $R_1$ is a phenyl group and $R_2$ is hydrogen.

21. A method for removing dissolved oxygen from alkaline water containing dissolved oxygen at a temperature greater than 400° F. which comprises the step of: adding to said alkaline water containing dissolved oxygen an effective oxygen-scavenging amount of a water-soluble semicarbazide of the formula

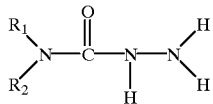

wherein $R_1$ is selected from the group consisting of $C_1$–$C_{10}$ alkyl, cycloalkyl, aryl, cycloalkyloxy and alkyloxy groups, and $R_2$ is selected from the group consisting of hydrogen, and $C_1$–$C_{10}$ alkyl, cycloalkyl, aryl, cycloalkyloxy, and alkyloxy groups; and an effective neutralizing amount of a neutralizing amine.

22. The method of claim 21 wherein said neutralizing amine is selected from the group consisting of cyclohexylamine, morpholine, diethylethanolamine and methoxypropylamine.

23. The method of claim 21 wherein 0.1–6 weight percent of said semicarbazide and 0.1–40 weight percent of said neutralizing amine are added to said alkaline water.

24. The method of claim 21 wherein $R_1$ is selected from the group consisting of morpholino, cyclohexylamino, ethyl, isopropyl, methyl, 3-methoxypropyl and phenyl groups and $R_2$ is selected from the group consisting of hydrogen, ethyl and morpholino groups.

25. The method of claim 21 wherein from 0.5 to 10 moles of semicarbazide per mole of dissolved oxygen are added to said water.

26. The method of claim 21 wherein said alkaline water is boiler water.

27. The method of claim 26 wherein said boiler water is subjected to deaeration to reduce the level of dissolved oxygen and said semicarbazide is added to said boiler water after deaeration to remove remaining dissolved oxygen.

28. The method of claim 21 wherein $R_1$ and $R_2$ are morpholino groups.

29. The method of claim 21 wherein $R_1$ is a cyclohexyl group and $R_2$ is hydrogen.

30. The method of claim 21 wherein $R_1$ and $R_2$ are ethyl groups.

31. The method of claim 21 wherein $R_1$ is an isopropyl group and $R_2$ is hydrogen.

32. The method of claim 21 wherein $R_1$ is a phenyl group and $R_2$ is hydrogen.

33. A method for removing dissolved oxygen from alkaline water containing dissolved oxygen at a temperature from about 250 to about 400° F. which comprises the step of adding to said alkaline water containing dissolved oxygen a) an effective oxygen-scavenging amount of a water soluble semicarbazide of the formula

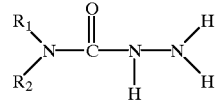

wherein $R_1$ is selected from the group consisting of $C_1$–$C_{10}$ alkyl, cycloalkyl, aryl, cycloalkyloxy and alkyloxy groups, and $R_2$ is selected from the group consisting of hydrogen, and $C_1$–$C_{10}$ alkyl, cycloalkyl, aryl, cycloalkyloxy, and alkyloxy groups;

b) an effective catalyzing amount of a catalyst capable of undergoing oxidation-reduction reactions selected from the group consisting of copper, cobalt, manganese, nickel, hydroquinone and combinations thereof; and c) an effective neutralizing amount of a neutralizing amine.

34. The method of claim 33 wherein said neutralizing amine is selected from the group consisting of cyclohexylamine, morpholine, diethylethanolamine and methoxypropylamine.

35. The method of claim 33 wherein 0.1–6 weight percent of said semicarbazide and 0.1–40 weight percent of said neutralizing amine are added to said alkaline water.

36. The method of claim 33 wherein $R_1$ is selected from the group consisting of morpholino, cyclohexyl, ethyl, isopropyl, methyl, 3-methoxypropyl and phenyl groups and $R_2$ is selected from the group consisting of hydrogen, ethyl and morpholino groups.

37. The method of claim 33 wherein from 2 to 10 moles of semicarbazide per mole of dissolved oxygen are added to said water.

38. The method of claim 33 wherein said alkaline water is boiler water.

39. The method of claim 38 wherein said boiler water is subjected to deaeration to reduce the level of dissolved oxygen and said semicarbazide is added to said boiler water after deaeration to remove remaining dissolved oxygen.

40. The method of claim 33 wherein $R_1$ and $R_2$ are morpholino groups.

41. The method of claim 33 wherein $R_1$ is a cyclohexyl group and $R_2$ is hydrogen.

42. The method of claim 33 wherein $R_1$ and $R_2$ are ethyl groups.

43. The method of claim 33 wherein $R_1$ is an isopropyl group and $R_2$ is hydrogen.

44. The method of claim 33 wherein $R_1$ is a phenyl group and $R_2$ is hydrogen.

* * * * *